(12) United States Patent
Yu et al.

(10) Patent No.: US 11,763,647 B2
(45) Date of Patent: Sep. 19, 2023

(54) MULTIMODE HAPTIC PATCH AND MULTIMODAL HAPTIC FEEDBACK INTERFACE

(71) Applicant: City University of Hong Kong, Hong Kong (CN)

(72) Inventors: Xinge Yu, Hong Kong (CN); Ya Huang, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 193 days.

(21) Appl. No.: 17/445,097

(22) Filed: Aug. 16, 2021

(65) Prior Publication Data
US 2023/0053027 A1 Feb. 16, 2023

(51) Int. Cl.
*G08B 6/00* (2006.01)

(52) U.S. Cl.
CPC ...................... *G08B 6/00* (2013.01)

(58) Field of Classification Search
CPC ........................................................ G08B 6/00
USPC ....................................................... 340/407.1
See application file for complete search history.

(56) References Cited

U.S. PATENT DOCUMENTS

| | | | |
|---|---|---|---|
| 9,600,083 B2 | 3/2017 | Levesque et al. | |
| 9,703,381 B2 | 7/2017 | Gallo et al. | |
| 10,416,768 B2 | 9/2019 | Khoshkava et al. | |
| 2007/0129707 A1* | 6/2007 | Blott | A61M 1/772 604/308 |
| 2008/0303782 A1* | 12/2008 | Grant | G06F 3/016 345/173 |
| 2009/0250267 A1* | 10/2009 | Heubel | G06F 3/041 178/18.03 |
| 2013/0265286 A1* | 10/2013 | Da Costa | G06F 3/016 340/407.1 |
| 2014/0375580 A1* | 12/2014 | Peshkin | G06F 3/016 345/173 |
| 2017/0276679 A1* | 9/2017 | Chapman | A61K 39/0011 |
| 2019/0148617 A1* | 5/2019 | Yi | H01L 23/373 136/205 |
| 2021/0267791 A1* | 9/2021 | Wright | A61F 7/00 |

* cited by examiner

*Primary Examiner* — Jack K Wang
(74) *Attorney, Agent, or Firm* — S&F/WEHRW

(57) ABSTRACT

A multimodal haptic feedback interface installed with a multimode haptic patch stimulates a skin area of a user to provide a haptic feedback including first and second haptic-feedback components to be sensed under static tactile sensing and dynamic tactile sensing, respectively. The patch is mounted with mechanical actuators, electrostimulation electrodes and thermoelectric pellets. The actuators generate a two-dimensional pattern of pressure on the skin area for generating the first haptic-feedback component. The electrostimulation electrodes electrically stimulates the skin area, causing the user to feel a vibration or pressure for generating the second haptic-feedback component. The actuators and electrostimulation electrodes are optimized only for static tactile sensing and dynamic tactile sensing, respectively, reducing an implementation cost while optimized for accuracy in haptic feedback generation. The thermoelectric pellets, realized as Peltier-effect heat pumps, generate a two-dimensional pattern of temperature change on the skin area for providing a thermal feedback to the user.

19 Claims, 7 Drawing Sheets

MULTIMODE HAPTIC PATCH AND MULTIMODAL HAPTIC FEEDBACK INTERFACE

FIELD OF THE INVENTION

The present invention relates to a multimodal haptic feedback interface installed with a multimode haptic patch for providing a haptic feedback to a user of the interface in a virtual reality (VR) or augmented reality (AR) application, where the haptic feedback is composed of one or more modes of tactile or thermal feedback.

BACKGROUND

VR and AR applications provide simulated experience to users. In some VR and AR applications, haptic feedbacks are provided to users. By incorporating haptic feedbacks when the users interact with virtual objects, the users may be able to feel texture, roughness and even temperature of the virtual objects, to feel being touched by or being collided with the virtual objects, etc.

Generally, haptic perception experienced by a user is a fusion of tactile feeling and thermal feeling. The user can gain tactile feeling through two modes of sensing, namely, static tactile sensing and dynamic tactile sensing. In static tactile sensing, the user senses an object that touches an area of the user's skin under a condition that the object is static with respect to the skin area. In dynamic tactile sensing, the user senses the object under a condition that the object considerably moves with respect to the skin area during touching, or that the object travels on the skin area during touching. In general, static tactile sensing and dynamic tactile sensing are different in nature, and create different perceptions at the user.

In VR and AR applications, the user receives a haptic feedback from a wearable user interface. In the art, such as U.S. Pat. Nos. 10,416,768 and 9,600,083, the user interface capable of generating a tactile feeling for the user usually is installed with mechanical actuators for physical generation of vibration and pressure, or is based on electrostimulation of muscle to create a perception of vibration and pressure at the user. An optional thermal feeling for accompanying with the tactile feeling may be introduced by controllably providing heating or cooling at the user interface by using Peltier elements (heat pumps) as disclosed in the art, for instance, in U.S. Pat. No. 9,703,381. However, typical mechanical actuators and electrostimulation devices are not particularly optimized for generating vibration and pressure covering stimuli for both static tactile sensing and dynamic tactile sensing, On one hand, if the mechanical actuators and electrostimulation devices are not optimized for both static tactile sensing and dynamic tactile sensing, accuracy in generating the stimuli by the user interface is reduced, thereby reducing an accuracy in reproducing an intended tactile perception at the user. On the other hand, optimizing the mechanical actuators and electrostimulation devices for both static tactile sensing and dynamic tactile sensing increases an implementation cost of the user interface.

There is a need in the art for a user interface optimized for generating a haptic feedback for both static tactile sensing and dynamic tactile sensing with accuracy while keeping a low implementation cost.

SUMMARY OF THE INVENTION

An aspect of the present invention is to provide a multimodal haptic feedback interface for stimulating an area of skin of a user to provide a haptic feedback to the user.

The interface comprises a plurality of mechanical actuators, a plurality of electrostimulation electrodes, one or more electrical drivers, and one or more computing processors. The plurality of mechanical actuators is used for generating a two-dimensional pattern of pressure on the skin area. The plurality of electrostimulation electrodes is used for electrically stimulating the skin area to cause the user to generate a feeling of vibration or pressure. The one or more electrical drivers are used for driving the plurality of mechanical actuators and the plurality of electrostimulation electrodes. The one or more computing processors are used for controlling the one or more electrical drivers. In particular, the one or more computing processors are configured as follows. If the haptic feedback includes a first haptic-feedback component intended to be sensed by the user under a first mode of static tactile sensing, the one or more computing processors control the one or more electrical drivers to drive the plurality of mechanical actuators to generate the first haptic-feedback component. If the haptic feedback includes a second haptic-feedback component intended to be sensed by the user under a second mode of dynamic tactile sensing, the one or more computing processors control the one or more electrical drivers to drive the plurality of electrostimulation electrodes to generate the second haptic-feedback component. Thereby, it allows the plurality of mechanical actuators to be optimized only for static tactile sensing without a need to be optimized for dynamic tactile sensing as well as allows the plurality of electrostimulation electrodes to be optimized only for dynamic tactile sensing without a need to be optimized for static tactile sensing.

Preferably, the interface further comprises a multimode haptic patch for contacting the skin area to deliver the haptic feedback to the user. The multimode haptic patch is mounted with the plurality of mechanical actuators and the plurality of electrostimulation electrodes. Additionally, it is preferable that the multimode haptic patch is flexible, allowing the multimode haptic patch to be adaptively shaped to seamlessly contact the skin area.

The interface may further comprise a plurality of thermoelectric pellets for generating a two-dimensional pattern of temperature change on the skin area. An individual thermoelectric pellet is realized as a Peltier-effect heat pump. The one or more electrical drivers are further configured to drive the plurality of thermoelectric pellets to generate a thermal feedback at the user. The multimode haptic patch is further mounted with the plurality of thermoelectric pellets. Additionally, it is preferable that the multimode haptic patch is flexible, allowing the multimode haptic patch to be adaptively shaped to seamlessly contact the skin area.

Preferably, the multimode haptic patch comprises a mounting layer for mounting the plurality of mechanical actuators and the plurality of thermoelectric pellets.

It is also preferable that the mounting layer is formed as a fabric layer woven with thermal-insulation ceramic fibers for providing flexibility and thermal insulation to the mounting layer.

The multimode haptic patch may further comprise a skin-contact layer having a skin-facing side. The skin-facing side is arranged to directly contact the skin area. The plurality of electrostimulation electrodes is mounted on the skin-facing side.

In certain embodiments, the skin-contact layer is made of polydimethylsiloxane (PDMS).

In certain embodiments, the multimode haptic patch further comprises a first thermally-conductive electrically-insulating layer positioned between the skin-contact layer and the mounting layer for electrically insulating the plurality of mechanical actuators and the plurality of thermoelectric pellets from the plurality of electrostimulation electrodes while allowing thermal conduction across the first thermally-conductive electrically-insulating layer. The first thermally-conductive electrically-insulating layer may be made of thermally conductive polymer.

Preferably, the multimode haptic patch further comprises a driving-signal distribution layer positioned adjacent to the mounting layer for distributing first and second pluralities of driving signals received from the one or more electrical drivers to the plurality of mechanical actuators and the plurality of thermoelectric pellets, respectively. The driving-signal distribution layer is electrically insulating and is mounted with a plurality of electrodes. The plurality of electrodes is used for electrically coupling the one or more electrical drivers with the plurality of thermoelectric pellets and the plurality of mechanical actuators. In certain embodiments, the driving-signal distribution layer is made of polyimide.

In certain embodiments, the multimode haptic patch further comprises a second thermally-conductive electrically-insulating layer adjacent to the driving-signal distribution layer for facilitating transmission of heat to and from the plurality of thermoelectric pellets. The second thermally-conductive electrically-insulating layer may be made of thermally conductive polymer.

In certain embodiments, an individual mechanical actuator has a substantially-circular impact area having a diameter in a range of 4 mm to 6 mm.

In certain embodiments, the one or more computing processors and the one or more electrical drivers are embedded into the multimode haptic patch such that the interface is realized in a form of patch.

Other aspects of the present invention are disclosed as illustrated by the embodiments hereinafter.

Figure 1:
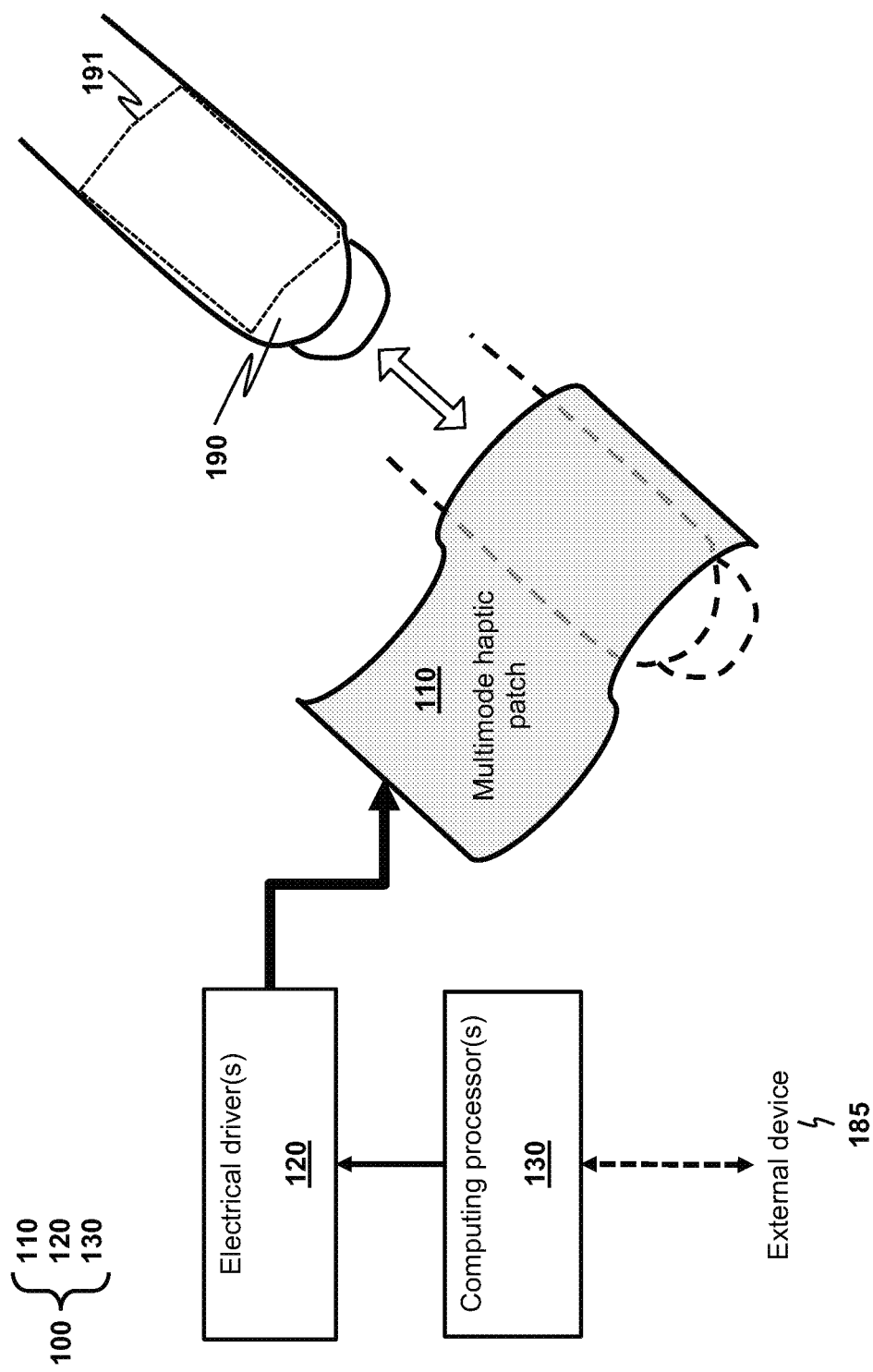
FIG. 1 depicts, in accordance with an exemplary embodiment of the present invention, a multimodal haptic feedback interface installed with a multimode haptic hatch, one or more electrical drivers and one or more computing processors.

Skilled artisans will appreciate that elements in the figures are illustrated for simplicity and clarity and have not necessarily been depicted to scale.

DETAILED DESCRIPTION

As used herein, "static tactile sensing" means a sensing condition of a person sensing a touch made by an object that touches an area of the person's skin, where the object is static or stationary with respect to the skin area when the object makes the touch for sensing. For example, the person grasps a smartphone on his or her hand, resulting in a static contact between the smartphone and the hand such that the touch of the object (viz., the smartphone) on the skin area (viz., the hand) is sensed by the person under the sensing condition of static tactile sensing. Even if the smartphone locally vibrates due to arrival of an incoming call, the vibration is considered a small-scale movement and the smartphone is still deemed to be in static contact with the hand.

As used herein, "dynamic tactile sensing" means a sensing condition of a person sensing a touch made by an object that touches an area of the person's skin, where the object making the touch is moving across or on the skin area when the person senses the touch. For instance, the person uses his or her fingers to scratch his or her face such that the person senses the scratch made on his or her face.

An aspect of the present invention is to provide a multimodal haptic feedback interface for stimulating an area of skin of a user to provide a haptic feedback to the user. The disclosed interface supports generation of tactile stimuli intended to be sensed by a first mode of static tactile sensing and a second mode of dynamic tactile sensing. Generation of thermal stimuli for a third mode of thermal sensing is supportable by the disclosed interface in certain embodiments. The haptic feedback delivered by the disclosed interface is composed of one or more stimuli selected from a first haptic-feedback component intended to be sensed by the user under the first mode of static tactile sensing, a second haptic-feedback component intended to be sensed under the second mode of dynamic tactile sensing, and optionally a third haptic-feedback component intended to be sensed under the third mode of thermal sensing. The first and second haptic-feedback components create first and second tactile feelings, respectively, at the user. The third haptic-feedback component creates a thermal feeling at the user. An overall haptic perception experienced by the user is a fusion of the first and second tactile feelings and the thermal feeling, if all the three haptic-feedback components are present in the haptic feedback. An advantage of the present invention is that the disclosed interface is optimized for accuracy in generating the haptic feedback for both static tactile sensing and dynamic tactile sensing while keeping a low implementation cost of the disclosed interface.

As mentioned above, static tactile sensing and dynamic tactile sensing are different in nature, and create different perceptions at the user. Reproducing these different perceptions requires accurate generation of the first and second haptic-feedback components. For the first mode of static tactile sensing, the disclosed interface is required to accurately generate a spatial pattern of pressure or vibration frequency over the skin area. For the second mode of dynamic tactile sensing, accurate generation of a temporal signal that characterizes a pressure or a vibration frequency over time is required.

An array of mechanical actuators is efficient to accurately generate the spatial pattern of pressure or vibration frequency. A high spatial resolution of the pattern can be easily achieved. However, an individual mechanical actuator often has a long settling time, hindering the array of mechanical actuators to respond quickly and accurately in generating the aforementioned temporal signal. Designing the individual mechanical actuator to provide a short settling time for achieving a quick response is possible, but the resultant actuator is potentially costly. Alternatively, electrostimulation is capable of triggering a quick response of a human body in creating a perception of vibration and pressure at the user, but the spatial resolution in creating the above-mentioned pattern of pressure or vibration frequency is low. Designing an array of electrostimulation electrodes to provide a sufficiently-high spatial resolution for the above-mentioned pattern is possible, but the resultant array of electrostimulation electrodes is potentially costly. Hence, the array of mechanical actuators and the array of electrostimulation electrodes are preferred to be used for the first mode of static tactile sensing and the second mode of dynamic tactile sensing, respectively. This arrangement is advantageously utilized in the disclosed multimodal haptic feedback interface for reducing the implementation cost.

Figure 2:
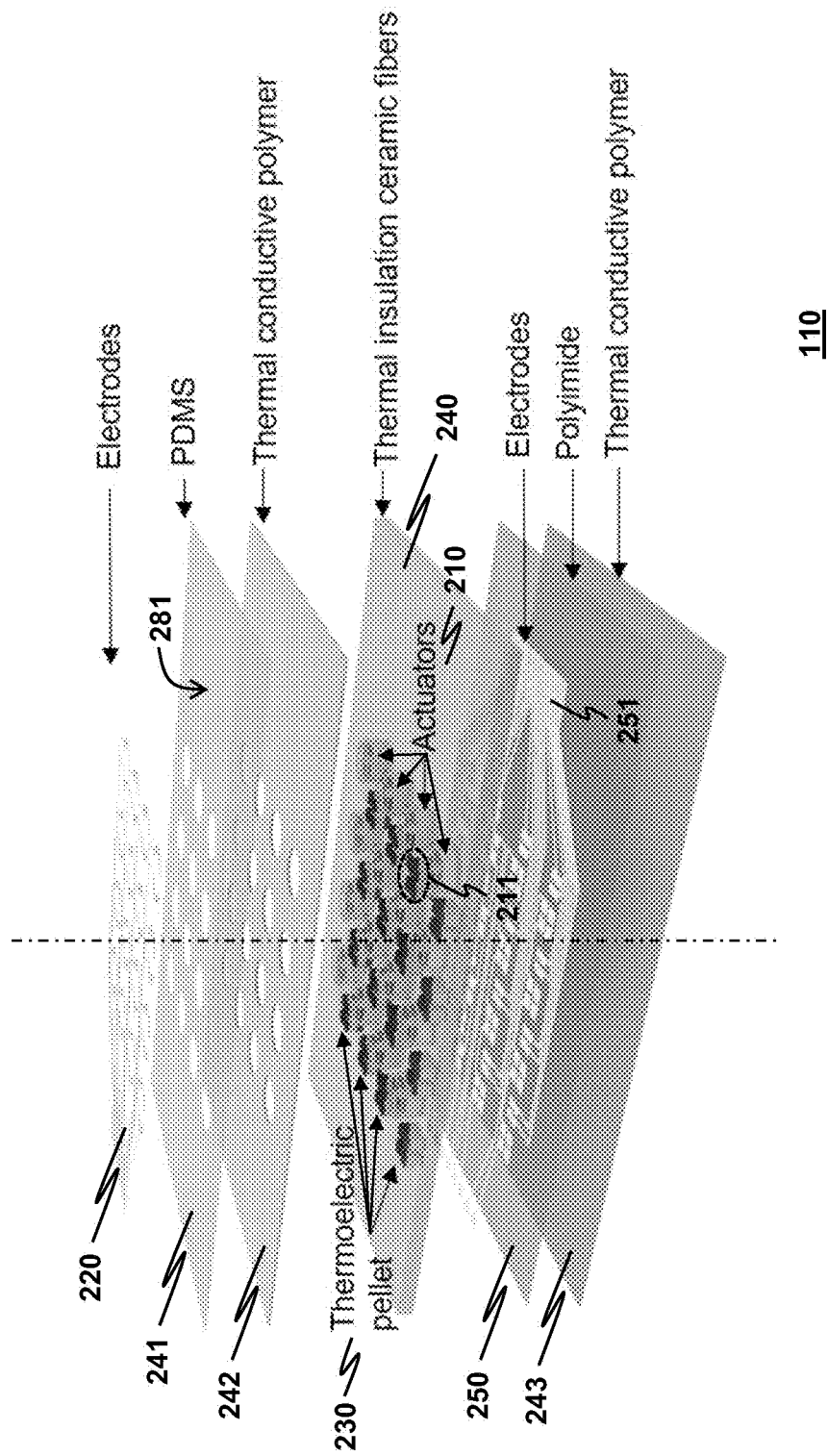
FIG. 2 depicts an exemplary embodiment of the multimode haptic patch, where the multimode haptic patch is shown in an exploded view.

Exemplarily, the disclosed interface is illustrated with the aid of FIGS. 1 and 2. FIG. 1 depicts a multimodal haptic feedback interface 100 in accordance with an exemplary embodiment of the present invention. One component of the interface 100 is a multimode haptic patch 110. FIG. 2 depicts, in exploded view, an exemplary embodiment of the multimode haptic patch 110.

The multimodal haptic feedback interface 100 is used for providing a haptic feedback to a user by stimulating a skin area 191 of the user. The interface 100 is installed with the multimode haptic patch 110 for contacting the skin area 191 to deliver the haptic feedback to the user. Preferably, the interface 100 is able to adhere to the skin area 191. As an example shown in FIG. 1, the skin area 191 is an area of skin on a fingertip 190 of the user. In practice, the multimode haptic patch 110 may be used to contact other parts of the user's body provided the size and form of the patch 110 is adapted to these other body parts. Preferably, the multimode haptic patch 110 is manufactured to be flexible, or at least bendable, such that the multimode haptic patch 110 can be adaptively shaped to seamlessly contact the skin area 191.

The multimode haptic patch 110 is mounted with a plurality of mechanical actuators 210 and a plurality of electrostimulation electrodes 220. The plurality of mechanical actuators 210 is used for generating a two-dimensional pattern of pressure on the skin area 191, thereby creating a first tactile perception in roughness, texture and pressure at the user. The plurality of electrostimulation electrodes 220 is used for electrically stimulating the skin area 191 to cause the user to generate a feeling of vibration or pressure, thereby creating a second tactile perception in roughness, texture and pressure at the user. In particular, the interface 100 is configured as follows. If the haptic feedback includes a first haptic-feedback component intended to be sensed by the user under a first mode of static tactile sensing, the plurality of mechanical actuators 210 is electrically driven and activated to generate the first haptic-feedback component. If the haptic feedback includes a second haptic-feedback component intended to be sensed by the user under a second mode of dynamic tactile sensing, the plurality of electrostimulation electrodes 220 is electrically driven and activated to generate the second haptic-feedback component. As an advantageous result, it allows the plurality of mechanical actuators 210 to be optimized only for static tactile sensing without a need to be optimized for dynamic tactile sensing. Similarly, the plurality of electrostimulation electrodes 220 is allowed to be optimized only for dynamic tactile sensing without a need to be optimized for static tactile sensing.

Figure 3:
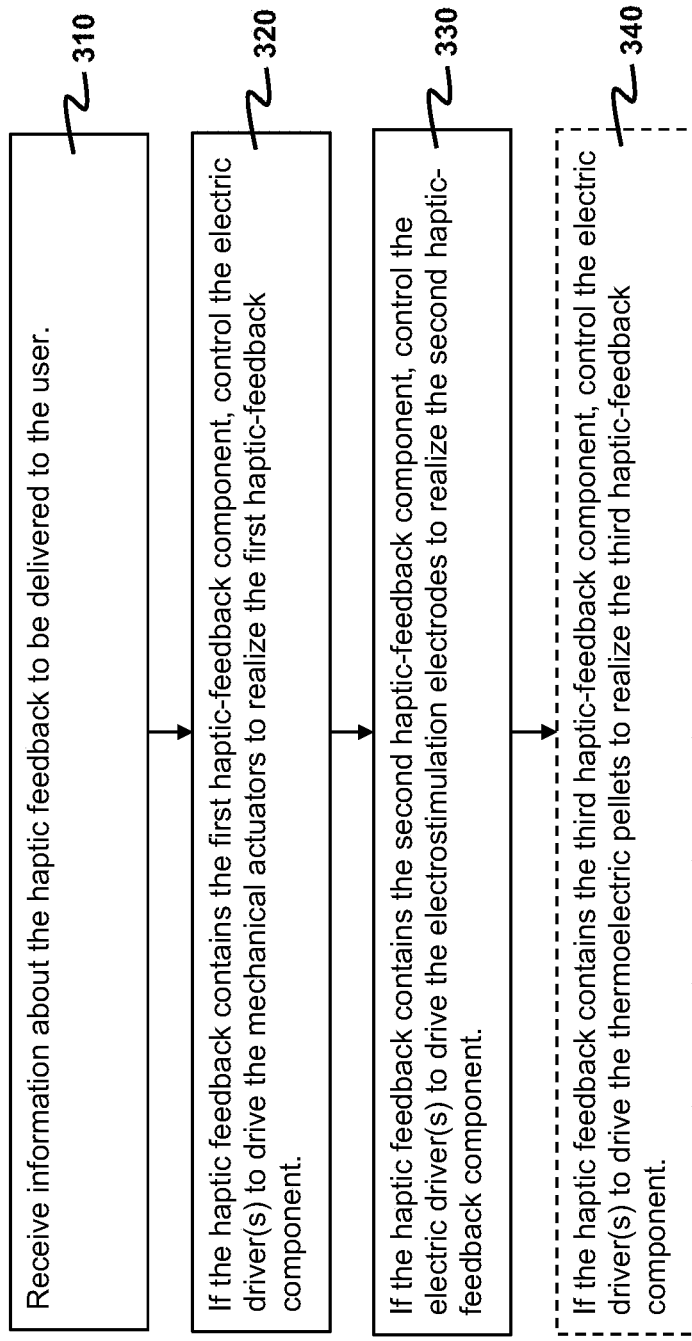
FIG. 3 depicts a flowchart showing exemplary steps taken by the one or more computing processors in controlling the one or more electrical drivers.

The interface 100 is further installed with one or more electrical drivers 120 and one or more computing processors 130. The one or more electrical drivers 120 are used for driving the plurality of mechanical actuators 210 and the plurality of electrostimulation electrodes 220. The one or more computing processors 130 are used for controlling the one or more electrical drivers 120. The one or more computing processors 130 are configured to execute a process of controlling the one or more electrical drivers 120. FIG. 3 depicts a flowchart showing exemplary steps of the controlling process. In a step 310 of the controlling process, the one or more computing processors 130 receive information about the haptic feedback to be delivered to the user. Since the interface 100 is used for a VR or AR application, the haptic feedback may be obtained from this application. If the haptic feedback includes the first haptic-feedback component, which is intended to be sensed by the user under static tactile sensing, the one or more computing processors 130 control the one or more electrical drivers 120 to drive the plurality of mechanical actuators 210 to realize the first haptic-feedback component in order to create the first tactile perception at the user (step 320). If the haptic feedback includes the second haptic-feedback component, which is intended to be sensed by the user under dynamic tactile sensing, the one or more computing processors 130 control the one or more electrical drivers 120 to drive the plurality of electrostimulation electrodes 220 to realize the second haptic-feedback component in order to create the second tactile perception at the user (step 330).

In certain embodiments, the interface 100 is further configured to provide a thermal feeling to the user. Specifically, the multimode haptic patch 110 is further mounted with a plurality of thermoelectric pellets 230 for generating a two-dimensional pattern of temperature change on the skin area 191. An individual thermoelectric pellet is realized as a Peltier-effect heat pump. In addition, the one or more electrical drivers 120 are further configured to drive the plurality of thermoelectric pellets 230 to generate a thermal feedback at the user. In a step 340 of the controlling process, the one or more computing processors 130 determine if the haptic feedback includes the third haptic-feedback component, which is related to provision of the thermal feedback to the user and is intended to be sensed by the user under thermal sensing. Upon determining that the third haptic-feedback component is included in the haptic feedback, the one or more computing processors 130 control the one or more electrical drivers 120 to drive the plurality of thermoelectric pellets 230 to realize the third haptic-feedback component in order to create the thermal feeling at the user.

As mentioned above, it is preferable that the multimode haptic patch 110 is flexible. A patch structure that offers flexibility to the multimode haptic patch 110 and allows the patch 110 to function as desired is shown in FIG. 2.

The multimode haptic patch 110 comprises a mounting layer 240 for mounting the plurality of mechanical actuators 210 and the plurality of thermoelectric pellets 230. To enable the mounting layer 240 to have flexibility, the mounting layer 240 may be realized with a textile material. Since the plurality of thermoelectric pellets 230 is intended to produce a two-dimensional pattern of temperature change, a temperature change introduced by an individual thermal pellet is required to be localized without substantially propagating to neighboring thermal pellets. Therefore, the textile material is selected to be thermally insulating. In certain embodiments, the mounting layer 240 is formed as a fabric layer woven with thermal-insulation ceramic fibers as the selected textile material for providing flexibility and thermal insulation to the mounting layer 240.

Figure 4:
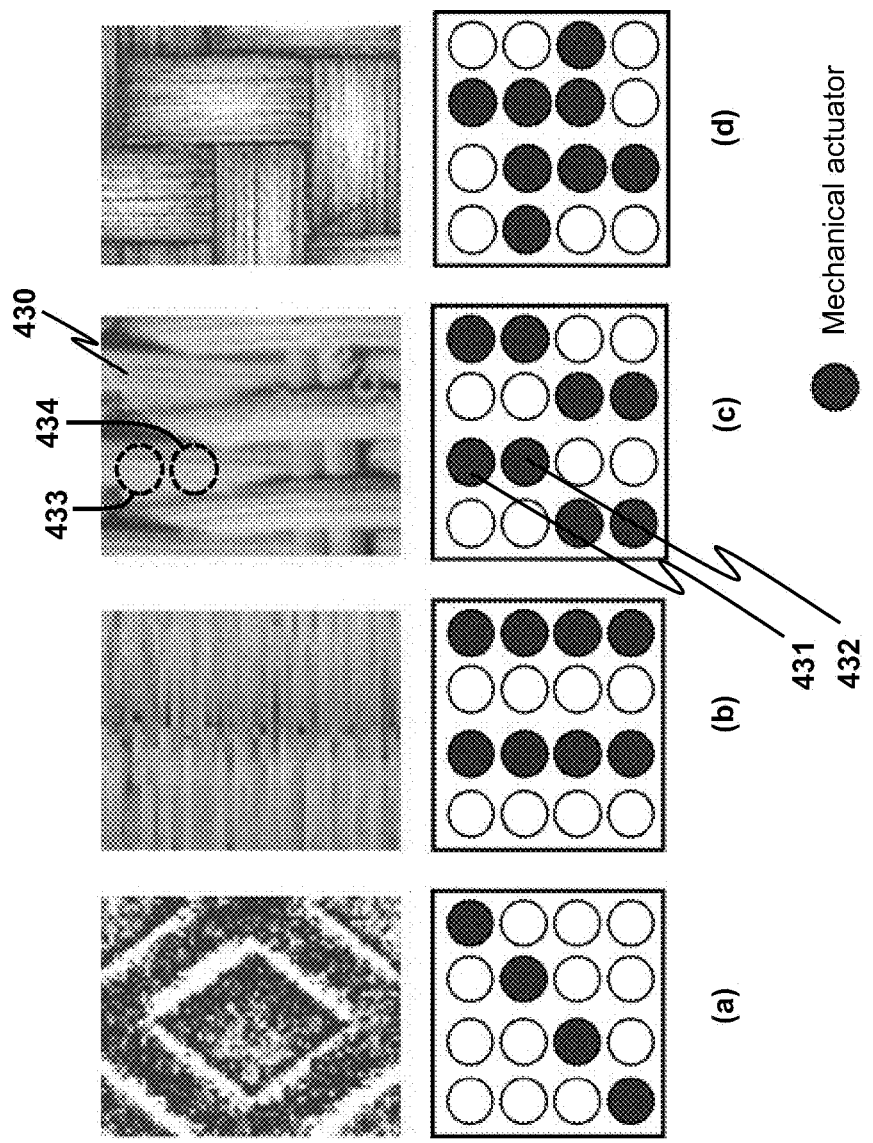
FIG. 4 depicts four examples of positioning mechanical actuators onto a fabric layer such that co-axial orientation of all the respective actuators is ensured

Since the fabric layer formed by weaving is not flat, respective actuators in the plurality of mechanical actuators 210 may not be axially oriented along a same direction if the respective actuators are put onto the fabric layer at randomly selected locations. All the respective actuators are required to be axially oriented along the same direction in order that the plurality of mechanical actuators 210 accurately generates the desired spatial pattern of pressure or vibration frequency over the skin area 191. FIG. 4 depicts four examples (a)-(d) of positioning the respective mechanical actuators onto a fabric layer such that co-axial orientation of all the respective actuators is ensured. In the four examples, mechanical actuators are mounted on flat tops of the fabric layer. Consider the example (c) for illustration. A fabric layer 430 has flat tops 433, 434. Mechanical actuators 431, 432 are mounted and positioned on the two flat tops 433, 434, respectively.

The multimode haptic patch 110 further comprises a skin-contact layer 241 for contacting the skin area 191. The skin-contact layer 241 has a skin-facing side 281 arranged to directly contact the skin area 191. The plurality of electrostimulation electrodes 220 is mounted on the skin-facing side 281 for electrically stimulating the skin area 191. The skin-contact layer 241 is made of a flexible material, such as PDMS, for making the skin-contact layer 241 flexible.

Preferably, the multimode haptic patch 110 further comprises a first thermally-conductive electrically-insulating layer 242 positioned between the skin-contact layer 241 and the mounting layer 240. The first thermally-conductive electrically-insulating layer 242 electrically insulates the plurality of mechanical actuators 210 and the plurality of thermoelectric pellets 230 from the plurality of electrostimulation electrodes 220, but allows heat energy to go across the first thermally-conductive electrically-insulating layer 242. As a result, the heating or cooling effect generated by the plurality of thermoelectric pellets 230 can be effectively applied to the skin area 191. The first thermally-conductive electrically-insulating layer 242 is made of a flexible material, such as thermally conductive polymer, for making this layer 242 flexible.

To power the plurality of mechanical actuators 210 and the plurality of thermoelectric pellets 230, the multimode haptic patch 110 further comprises a driving-signal distribution layer 250 positioned adjacent to the mounting layer 240. The driving-signal distribution layer 250 is used for distributing first and second pluralities of driving signals received from the one or more electrical drivers 120 to the plurality of mechanical actuators 210 and the plurality of thermoelectric pellets 230, respectively. The driving-signal distribution layer 250 is electrically insulating, and is mounted with a plurality of electrodes 251. The plurality of electrodes 251 is used for electrically coupling the one or more electrical drivers 120 with the plurality of thermoelectric pellets 230 and the plurality of mechanical actuators 210 such that the plurality of electrodes 251 carries the first and second pluralities of driving signals. The driving-signal distribution layer 250 may be made of polyimide for making this layer 250 flexible.

Preferably, the multimode haptic patch 110 further comprises a second thermally-conductive electrically-insulating layer 243 positioned adjacent to the driving-signal distribution layer 250 for facilitating transmission of heat to and from the plurality of thermoelectric pellets 230. One use of the second thermally-conductive electrically-insulating layer 243 is to electrically isolate the plurality of electrodes 251 from outside the multimode haptic patch 110 so as to, for example, avoid the user from getting an electric shock. Another use of this layer 243 is to compensate for the heat loss or dissipate the heat gain from the plurality of thermoelectric pellets 230. Since an individual thermoelectric pellet operates as a heat pump, one side of the pellet is hot while another side is cool. If the hot side faces the first thermally-conductive electrically-insulating layer 242, the heat is transmitted to the skin area 191 via the first thermally-conductive electrically-insulating layer 242, and the cool side receives heat from outside the multimode haptic patch 110 via the second thermally-conductive electrically-insulating layer 243. The second thermally-conductive electrically-insulating layer 243 is made of a flexible material, such as thermally conductive polymer, for making this layer 243 flexible.

Other implementation aspects of the interface 100 are elaborated as follows.

Anatomically, the haptic feedback is received by tactile receptors and thermal receptors in a dermis of the skin area 191. In general, there are three types of tactile receptors (Pacinian corpuscle, Meissner corpuscle and Merkel cell) and two types of thermal receptors (free nerve endings, and Krause end bulb). The plurality of mechanical receptors 210 and the plurality of electrostimulation electrodes 220 may be optimized with reference to characteristics of respective tactile receptors responsible for static tactile sensing and dynamic tactile sensing, respectively.

The Pacinian corpuscle determines gross touch and distinguishes rough and soft substances, so that this corpuscle plays a key role in static tactile sensing. The Pacinian corpuscle is most sensitive to vibration around 200 Hz to 300 Hz with an optimal sensitivity of 250 Hz. An individual mechanical actuator in the plurality of mechanical actuators 210 may be optimized to be most accurate in generating vibration of frequency preferably at 250 Hz, more preferably in a range of 225 Hz to 275 Hz, and even more preferably in a range of 200 Hz to 300 Hz. If the individual mechanical actuator has an impact area 211 that is substantially circular, the diameter of the impact area may be selected to be 5 mm, more preferably in a range of 4 mm to 6 mm. The selected diameter corresponds to a spatial resolution of the Pacinian corpuscle from several millimeters to one centimeter.

The Meissner corpuscle reacts to light touch and moderate vibration of 10 Hz to 50 Hz. Hence, the Meissner corpuscle plays a key role in feeling gentle tactile stimuli in dynamic tactile sensing. The Merkel cell reacts to low-frequency vibration of 5 Hz to 15 Hz. Thus, this cell is relevant to sensing pressure in dynamic tactile sensing. The second plurality of driving signals, generated from the one or more electrical drivers 120 and used for driving the plurality of electrostimulation electrodes 220, may be optimized to be most accurate in creating the second tactile perception at the user for a feeling of vibration having a frequency in a range of 10 Hz to 15 Hz, more preferably in a range of 10 Hz to 30 Hz, even more preferably in a range of 10 Hz to 50 Hz, yet even more preferably in a range of 5 Hz to 50 Hz.

Regarding implementation of the one or more computing processors 130, an individual computing processor may be implemented by a microcontroller, a general-purpose processor, or a special-purpose processor such as an application specific integrated circuit (ASIC) or a digital signal processor (DSP), or by reconfigurable logics such as a field programmable gate array (FPGA).

With the advance of integrated circuit fabrication technologies, it is possible that the one or more computing processors 130 and the one or more electrical drivers 120 are each implemented as a chip small enough to be embedded into the multimode haptic patch 110. In certain embodiments, the one or more computing processors 130 and the one or more electrical drivers 120 are embedded into the multimode haptic patch 110 such that the multimodal haptic feedback interface 100 is realized in a form of patch.

Apart from communicating with the one or more electrical drivers 120, the one or more computing processors 130 may also communicate with an external device 185 (see FIG. 2), for example, an external computing server to retrieve information in running a VR or AR application.

Although it is preferred that the multimode haptic patch 110 is flexible, the present invention is not limited only to this case; the multimode haptic patch 110 may be manufactured to be rigid. For example, the patch 110 may be realized as a rigid pad on which a hand may press to receive the haptic feedback.

Although FIG. 3 depicts that the steps 320, 330 and 340 are executed in this order as an example for illustration, those skilled in the art will appreciate that the execution order of these steps may be changed without materially affecting the outcome of the controlling process, and that some or all of these steps may be executed in parallel.

Figure 5:
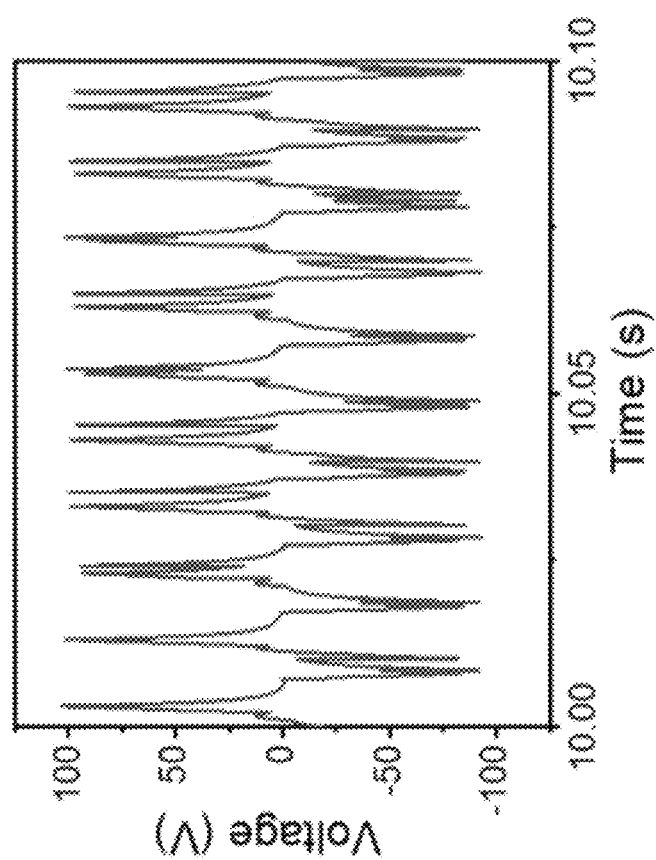
FIG. 5 depicts a typical waveform of a driving signal in driving an electrostimulation electrode for generating a perception of roughness at a person as used in the multimodal haptic feedback interface.

Some experimental results are provided hereinafter as examples of generating the second plurality of driving signals for driving the plurality of electrostimulation electrodes 220. FIG. 5 depicts a typical waveform of a driving signal in driving a representative electrostimulation electrode. Table 1 below lists parameters of the driving signal (frequency, duty cycle and switching time) versus the second tactile perception in roughness as reproduced in human subjects.

TABLE 1

Degree of roughness generated under different parameters of driving signal in electrostimulation.

| Frequency (Hz) | Duty cycle | Switching time (ms) | Roughness (mm) |
| --- | --- | --- | --- |
| 50 | 25% | 20 | 1.71 |
| 100 | 25% | 20 | 1.89 |
| 100 | 30% | 50 | 2.84 |
| 100 | 35% | 100 | 3.05 |

Some experimental results are provided hereinafter as examples of generating a temperature change by the plurality of thermoelectric pellets 230.

Figure 6:
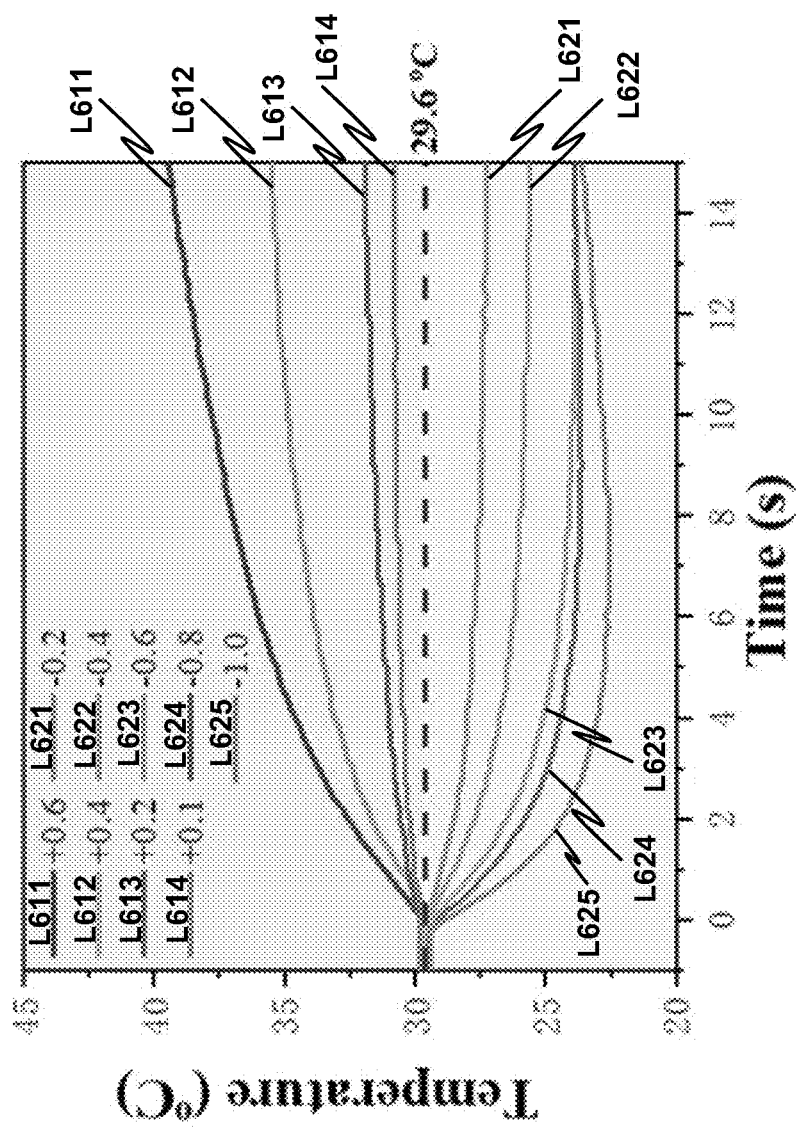
FIG. 6 plots experimental results of temperature change versus time when a current is applied to a thermoelectric pellet for generating a temperature change as used in the multimodal haptic feedback interface.

FIG. 6 plots the temperature change versus time as a current is applied to a thermoelectric pellet under test. Temperatures against current levels of +0.6A (L611), +0.4A (L612), +0.2A (L613), +0.1A (L614), −0.2A (L621), −0.4A (L622), −0.6A (L623), −0.8A (L624) and −1.0A (L625) are shown. A positive current level is different from a negative current level in flow direction of the current. Hence, directions of heat flow in the plurality of thermoelectric pellets 230 are opposite for positive and negative currents. The results in FIG. 6 show that heating and cooling can be accomplished by changing a polarity of current in driving the thermoelectric pellet under test.

Figure 7:
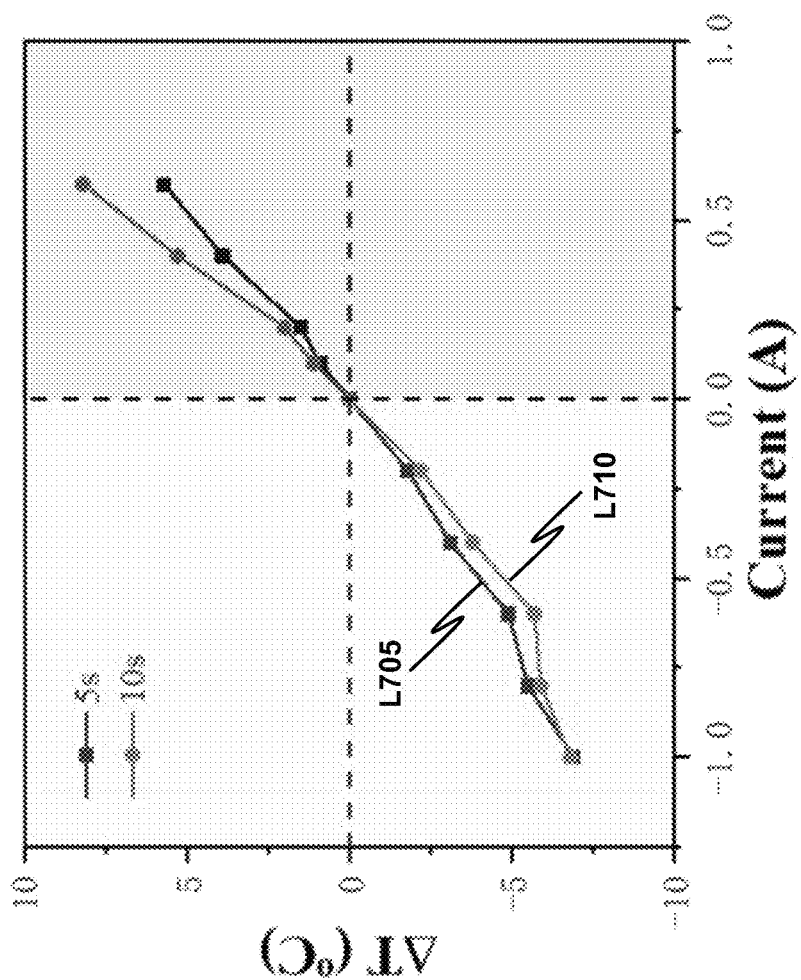
FIG. 7 plots corresponding temperature changes at time instants of 5 s and 10 s versus different current levels as the current is applied to the thermoelectric pellet.

FIG. 7 plots corresponding temperature changes at time instants of 5 s (L705) and 10 s (L710) versus different current levels as the current is applied to the thermoelectric pellet under test. The results in FIG. 7 demonstrate that the temperature change is stabilized after the current is applied for 5 s.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A multimodal haptic feedback interface for stimulating an area of skin of a user to provide a haptic feedback to the user, the interface comprising;
   a plurality of mechanical actuators for generating a two-dimensional pattern of pressure on the skin area;
   a plurality of electrostimulation electrodes being arranged to directly contact the skin area for electrically stimulating the skin area to cause the user to generate a feeling of vibration or pressure;
   one or more electrical drivers for driving the plurality of mechanical actuators and the plurality of electrostimulation electrodes; and
   one or more computing processors for controlling the one or more electrical drivers, wherein the one or more computing processors are configured to:
      if the haptic feedback includes a first haptic-feedback component intended to be sensed by the user under a first mode of static tactile sensing, drive the plurality of mechanical actuators to generate the first haptic-feedback component; and
      if the haptic feedback includes a second haptic-feedback component intended to be sensed by the user wider a second mode of dynamic tactile sensing, drive the plurality of electrostimulation electrodes to generate the second haptic-feedback component;
   thereby allowing the plurality of mechanical actuators to be optimized only for static tactile sensing without a need to be optimized for dynamic tactile sensing as well as allowing the plurality of electrostimulation electrodes to be optimized only for dynamic tactile sensing without a need to be optimized for static tactile sensing.

2. The interface of claim 1 further comprising:
   a multimode haptic patch for contacting the skin area to deliver the haptic feedback to the user, wherein the multimode haptic patch is mounted with the plurality of mechanical actuators and the plurality of electrostimulation electrodes.

3. The interface of claim 2, wherein the multimode haptic patch is flexible, allowing the multimode haptic patch to be adaptively shaped to seamlessly contact the skin area.

4. The interface of claim 2, wherein the one or more computing processors and the one or more electrical drivers are embedded into the multimode haptic patch such that the interface is realized in a form of patch.

5. The interface of claim 1 further comprising:
   a plurality of thermoelectric pellets for generating a two-dimensional pattern of temperature change on the skin area, an individual thermoelectric pellet being realized as a Peltier-effect heat pump, wherein the one or more electrical drivers are further configured to drive the plurality of thermoelectric pellets to generate a thermal feedback at the user.

6. The interface of claim 5 further comprising:
a multimode haptic patch for contacting the skin area to deliver the haptic feedback to the user, wherein the multimode haptic patch is mounted with the plurality of mechanical actuators, the plurality of electrostimulation electrodes and the plurality of thermoelectric pellets.

7. The interface of claim 6, wherein the multimode haptic patch is flexible, allowing the multimode haptic patch to be adaptively shaped to seamlessly contact the skin area.

8. The interface of claim 6, wherein the one or more computing processors and the one or more electrical drivers are embedded into the multimode haptic patch such that the interface is realized in a form of patch.

9. The interface of claim 6, wherein the multimode haptic patch comprises:
a mounting layer for mounting the plurality of mechanical actuators and the plurality of thermoelectric pellets.

10. The interface of claim 9, wherein the mounting layer is formed as a fabric layer woven with thermal-insulation ceramic fibers for providing flexibility and thermal insulation to the mounting layer.

11. The interface of claim 9, wherein the multimode haptic patch further comprises:
a skin-contact layer having a skin-facing side, the skin-facing side being arranged to directly contact the skin area, wherein the plurality of electrostimulation electrodes is mounted on the skin-facing side.

12. The interface of claim 11, wherein the skin-contact layer is made of polydimethylsiloxane (PDMS).

13. The interface of claim 11, wherein the multimode haptic patch further comprises:
a first thermally-conductive electrically-insulating layer positioned between the skin-contact layer and the mounting layer for electrically insulating the plurality of mechanical actuators and the plurality of thermoelectric pellets from the plurality of electrostimulation electrodes while allowing thermal conduction across the first thermally-conductive electrically-insulating layer.

14. The interface of claim 13, wherein the first thermally-conductive electrically-insulating layer is made of thermally conductive polymer.

15. The interface of claim 11, wherein the mode haptic patch further comprises:
a driving-signal distribution layer positioned adjacent to the mounting layer for distributing first and second pluralities of driving signals received from the one or more electrical drivers to the plurality of mechanical actuators and the plurality of thermoelectric pellets, respectively, wherein the driving-signal distribution layer is electrically insulating and is mounted with a plurality of electrodes, the plurality of electrodes being used for electrically coupling the one or more electrical drivers with the plurality of thermoelectric pellets and the plurality of mechanical actuators.

16. The interface of claim 15, wherein the driving-signal distribution layer is made of polyimide.

17. The interface of 16, wherein the multimode haptic patch further comprises a second thermally-conductive electrically-insulating layer adjacent to the driving-signal distribution layer for facilitating transmission of heat to and from the plurality of thermoelectric pellets.

18. The interface of claim 17, wherein the second there ally-co electrically-insulating layer is made of thermally conductive polymer.

19. The interface of claim 1, wherein an individual mechanical actuator has a substantially-circular impact area having a diameter in a range of 4 mm to 6 mm.

* * * * *